(12) United States Patent
Brown

(10) Patent No.: US 12,318,897 B1
(45) Date of Patent: Jun. 3, 2025

(54) RECHARGEABLE BATTERY POWERED VALVE SPRING COMPRESSOR

(71) Applicant: Donald R. Brown, Montrose, PA (US)

(72) Inventor: Donald R. Brown, Montrose, PA (US)

( * ) Notice: Subject to any disclaimer, the term of this patent is extended or adjusted under 35 U.S.C. 154(b) by 503 days.

(21) Appl. No.: 17/734,284

(22) Filed: May 2, 2022

(51) Int. Cl.
   *B25B 27/00* (2006.01)
   *B25B 27/26* (2006.01)
   *B25F 5/02* (2006.01)
   *H01M 10/0525* (2010.01)

(52) U.S. Cl.
   CPC ............... *B25B 27/26* (2013.01); *B25F 5/02* (2013.01); *F01L 2303/01* (2020.05); *H01M 10/0525* (2013.01)

(58) Field of Classification Search
   CPC .................................. B25B 27/00; B25F 3/00
   See application file for complete search history.

(56) References Cited

U.S. PATENT DOCUMENTS

| | | | |
|---|---|---|---|
| 5,349,732 A * | 9/1994 | Spence ..................... | B25B 7/02 29/221 |
| 5,689,870 A | 11/1997 | Robey | |
| 6,199,253 B1 * | 3/2001 | Snowden ................ | B25B 27/26 29/220 |
| 6,345,436 B1 | 2/2002 | Codrington | |
| 6,546,596 B2 * | 4/2003 | Grote .................. | B05C 17/0205 16/113.1 |
| 7,104,161 B2 | 9/2006 | De Waal | |
| 8,621,991 B1 | 1/2014 | Lopez et al. | |
| 9,327,393 B1 | 5/2016 | DePyssler | |
| 9,364,929 B1 | 6/2016 | Sismanoglu et al. | |
| 9,862,082 B2 | 1/2018 | Moore | |
| 2005/0276658 A1 * | 12/2005 | Silva ....................... | F16G 15/06 403/154 |
| 2009/0165603 A1 * | 7/2009 | Aguirre .................... | H01K 3/32 81/426.5 |
| 2018/0161844 A1 * | 6/2018 | Lütolf .................. | B21D 39/046 |
| 2021/0129310 A1 * | 5/2021 | Barezzani .............. | B23D 29/00 |

* cited by examiner

*Primary Examiner* — Lee D Wilson

(74) *Attorney, Agent, or Firm* — Cramer Patent & Design, PLLC.; Aaron R. Cramer

(57) ABSTRACT

A rechargeable battery powered valve spring compressor is a battery powered valve spring compressor. The device takes the same overall form as a standard battery powered drill with the approximate dimensions of two inches (2") wide, six inches (6") deep and nine inches (9") tall. The device is also provided with a compression mechanism with interchangeable tips for different sized valve springs. A series of gears produce the necessary torque from the motor to operate the compression mechanism. The device is powered by a motor and controlled by a reversing switch allowing the jaws of the device to open and close thus releasing and compressing the spring respectively. The device is also powered by a removable lithium-ion battery that is envisioned to be shared amongst other common battery powered tools.

2 Claims, 4 Drawing Sheets

RECHARGEABLE BATTERY POWERED VALVE SPRING COMPRESSOR

RELATED APPLICATIONS

None.

FIELD OF THE INVENTION

The present invention relates to a rechargeable battery and more specifically to a rechargeable battery powered by a valve spring compressor.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. One tool that is found in almost any mechanic's shop is that of a valve spring compressor. Such tools are necessary to remove the powerful springs that holds valves in place on internal combustion engines allowing both the spring and the valve to be removed. Such removal is necessary for service and/or repair of small engines such as those found on lawnmowers to larger engines as found in motor vehicles.

Current valve spring compressors rely on a threaded shaft that must be turned by physical strength. While such strength can be produced by most mechanics, such a task quickly becomes tiring when removing or installing multiple springs. Should a mechanic do such workday in and day out, repetitive stress injuries may even result. Accordingly, there exists a need for a means by which a valve springs can be easily compressed without the physical work as described above. The development of the rechargeable battery powered valve spring compressor fulfills this need.

SUMMARY OF THE INVENTION

The principles of the present invention provide for a valve spring compressor tool having a compression head which has a pair of arms, the pair of arms pivot along a hidden pivot point to open and close of each of the pair of arms along an arm travel path, a removable tool tip which is disposed on a distal end of each of the pair of arms, the pair of arms include an upper arm and a lower arm, a motor housing which has an open/close switch to open and close the pair of arms along the arm travel path, and a removable rechargeable battery which is adapted to be utilized interchangeably with an additional power tool.

The removable tool tip may be located at the distal end of one of the pair of arms and is held in place via a retaining means. The retaining means may be a spring pin. The retaining means may allow for removal of the removable tool tips along a tool tip removal path. Each of the removable tool tips may include a flanged opening which engages a valve spring and one or more retaining caps. The removable tool tips may include the flanged opening having a plurality of differing internal diameters to allow working with a plurality of makes and models of the valve spring used on a plurality of internal combustion engines from a plurality of differing manufacturers. The removable tool tips may have a plurality of differing sizes used on the upper arm.

The removable tool tips of the differing sizes may be used on the lower arm. The motor housing may include a variable speed trigger which controls the valve spring compressor tool. A plurality of resultant power may pass through a variable speed control circuit which is controlled by the variable speed trigger. The variable speed control circuit may generate a modulated power signal to allow for variable speed as well as low speed operation.

After engaging the valve spring with the valve spring compressor tool, the open/close switch and the variable speed trigger may be utilized to collapse the valve spring along the arm travel path and allow for the removal of the valve spring. A first plurality of electrical power then may pass to a switch which reverses the polarity of the voltage and thus the direction of rotation of a drive motor.

The removable rechargeable battery may be removed from the motor housing along a battery removal/replacement path. A second plurality of electrical power may be derived from the removable rechargeable battery and passes through a set of battery contacts which allow for removal of the removable rechargeable battery along the battery removal/replacement path. The removable rechargeable battery may be recharged by an additional removable rechargeable battery. The removable rechargeable battery may be a 40V lithium-ion battery. The valve spring compressor tool may be utilized on one or more intake valve springs. The valve spring compressor tool may be utilized on one or more exhaust valve springs.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
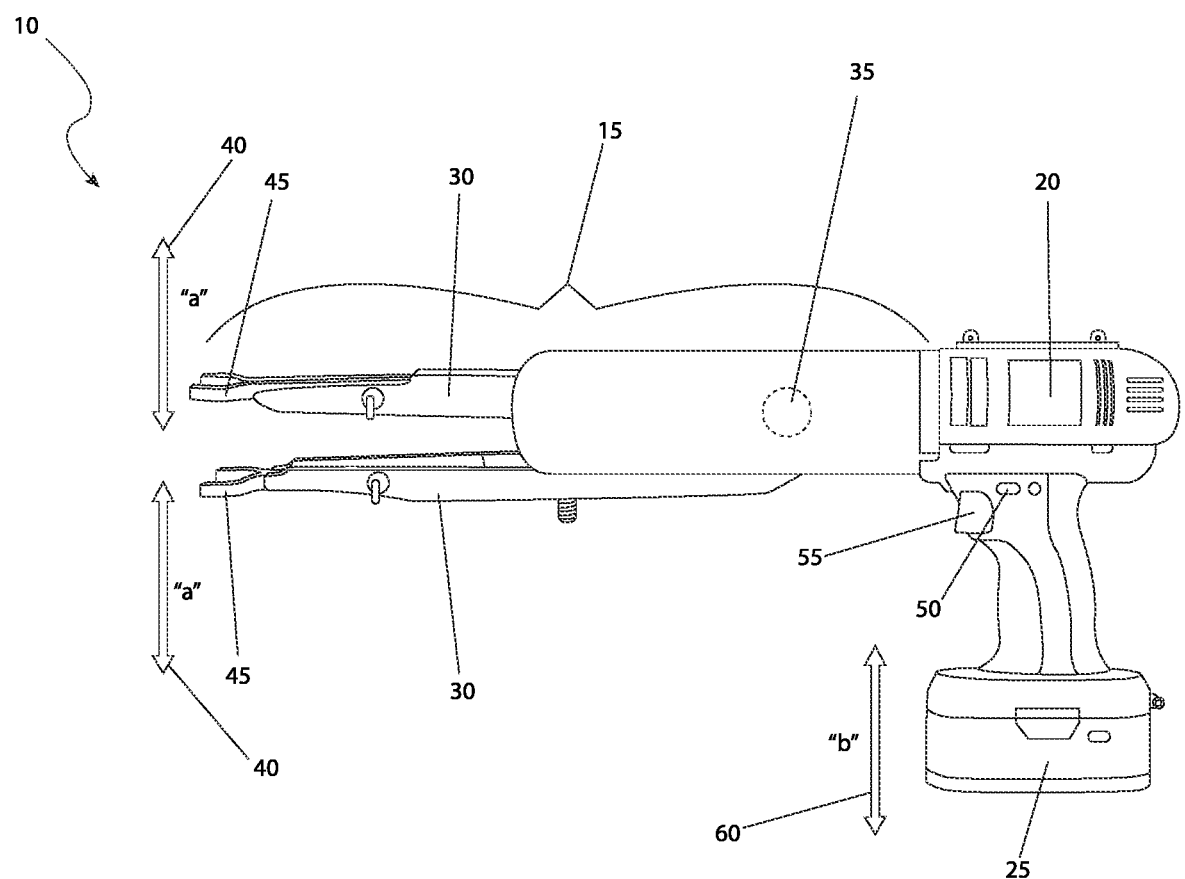
FIG. 1 is a side view of the valve spring compressor tool, according to the preferred embodiment of the present invention.

DESCRIPTIVE KEY 10 valve spring compressor tool
15 compression head
20 motor housing
25 rechargeable battery
30 arm
35 hidden pivot point
40 arm travel path "a"
45 tool tip
50 switch
55 variable speed trigger
60 battery removal/replacement path "b"
65 retaining means
70 tool tip removal path "t"
75 flanged opening
80 internal combustion engine
85 valve compartment
90 user
95 valve spring
100 battery contact 105 variable speed control circuit
110 drive motor

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a side view of the valve spring compressor tool 10, according to the preferred embodiment of the present invention is disclosed. The valve spring compressor tool (herein also described as the "tool") 10, provides for the controlled compression and decompression of a valve spring 95 on an internal combustion engine 80 during repair and overhaul operations. The invention comprises primarily of three (3) components: a compression head 15, a motor housing 20, and a removable rechargeable battery 25. The compression head 15 is similar to a manually-operated valve spring compression tool complete with two (2) arms 30. The arms 30 pivot along a hidden pivot point 35 here depicted by a dashed line, due to its hidden nature, and allow for the opening and closing of the arms 30 along an arm travel path "a" 40. A removable tool tip 45 is located at the distal end of each arm 30. Further detail on the tool tips 45 will be provided herein below.

The motor housing 20 is similar in design to other portable battery-operated power tools such as drills, impact drivers, ratchet drivers, and the like. The motor housing 20 is provided complete with an open/close switch 50 that provides for the opening and closing of the arms 30 along the arm travel path "a" 40 and operates much the same as a forward/reverse switch on a conventional portable battery-operated power tool. The motor housing 20 is also provided with a variable speed trigger 55 which not only controls on/off operation of the tool 10, but also the speed at which the arms 30 open and close. The rechargeable battery 25, envisioned to be of the forty-volt (40V) lithium-ion variety, is typical for other cordless battery-operated power tools, and is envisioned to be interchangeable such that a family of power tools can use the same rechargeable battery 25. Such a feature is not only envisioned to lower the overall cost of ownership of the tool 10, by not purchasing a dedicated removable rechargeable battery 25 for use with the tool 10, but allows continued use of the tool 10, should a removable rechargeable battery 25 become depleted during use, by allowing interchanging with another rechargeable battery 25 while the original depleted rechargeable battery 25 is recharged. Removal/replacement of the rechargeable battery 25 is accomplished along a battery removal/replacement path "b" 60.

Figure 2:
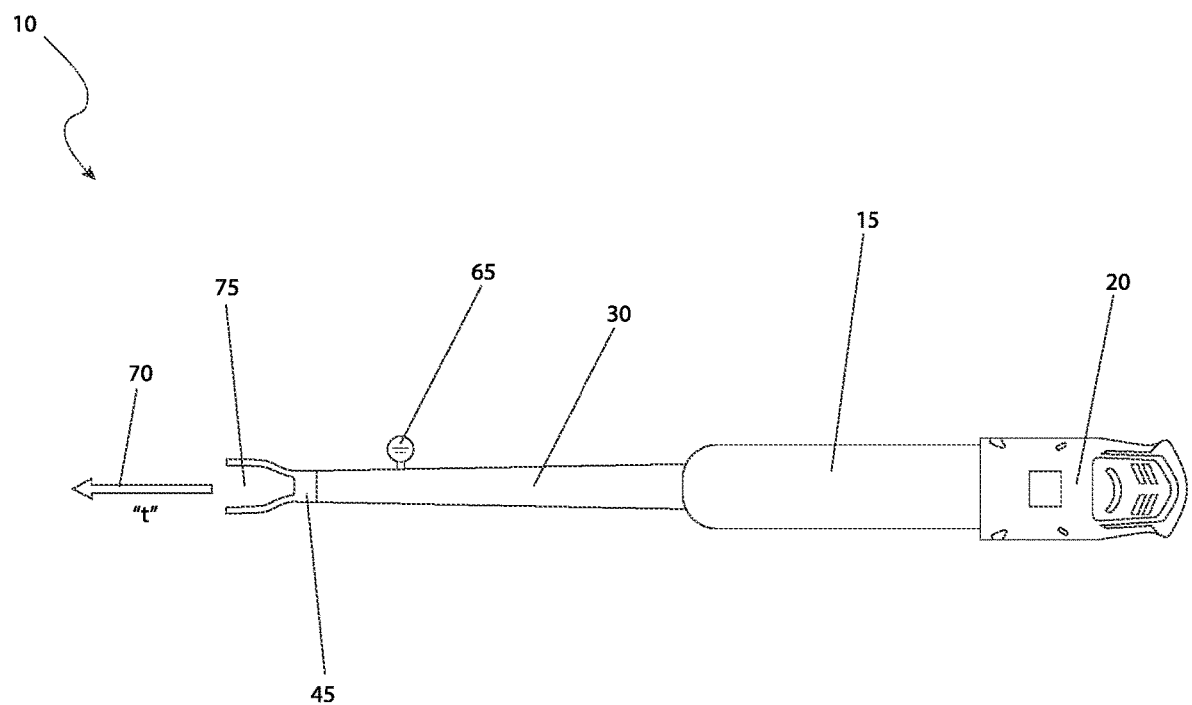
FIG. 2 is a top view of the valve spring compressor tool, according to the preferred embodiment of the present invention.

Referring next to FIG. 2, a top view of the compressor tool 10, according to the preferred embodiment of the present invention is depicted. This view provides additional clarity on the relationship between the compression head 15, the motor housing 20, and the arms 30. The tool tip 45 is located at the distal end of the arm 30 and is held in place via a retaining means 65 such as a screw, spring pin, or the like. Manipulation of the retaining means 65 allows for removal of the tool tips 45 along a tool tip removal path "t" 70. Each tool tip 45 is provided with a flanged opening 75 which engages valve spring 95 and retaining caps as will be further described below. The interchangeability of the removable tool tips 45 provide for a flanged opening 75 of differing internal diameters, thus working with all makes and models of valve springs 95 used on internal combustion engines 80 from differing manufacturers. It is noted that removable tool tips 45 of differing sizes can be used on either the upper or lower arm 30 (as shown in FIG. 1) depending upon actual usage needs.

Figure 3:
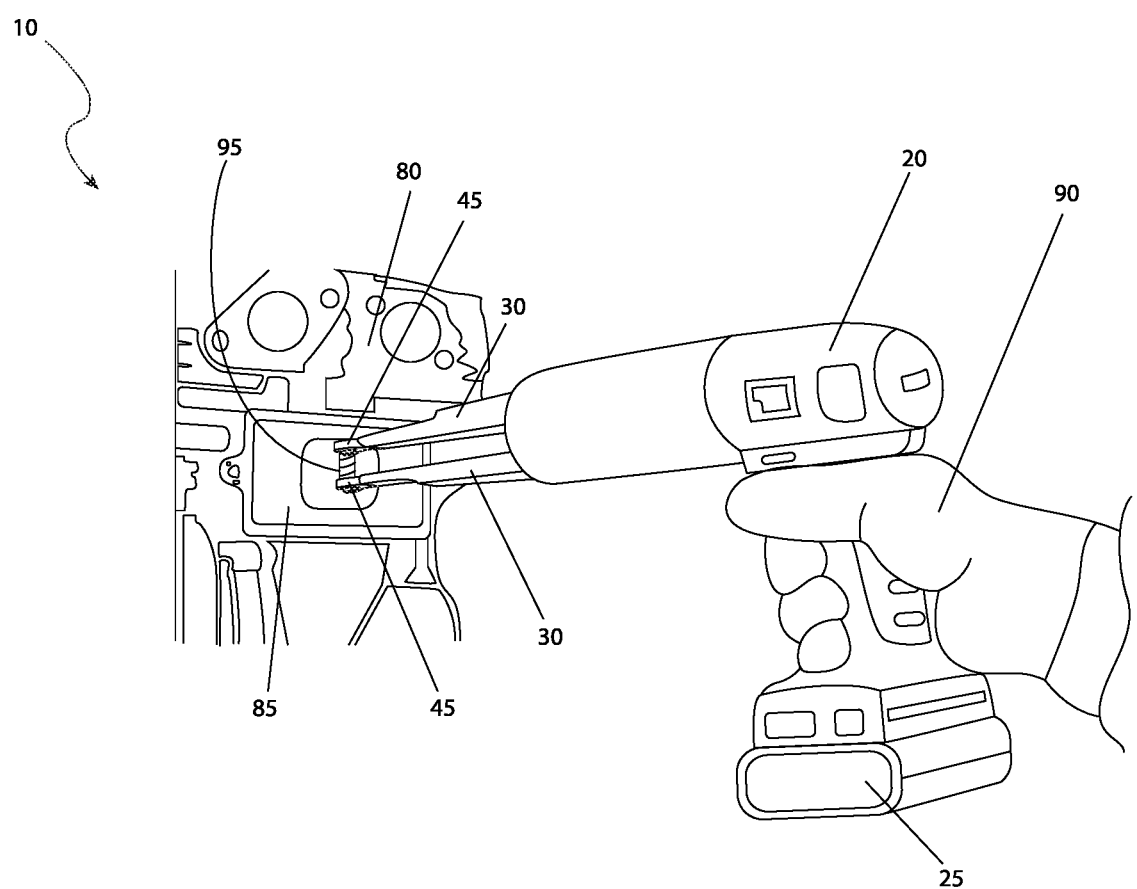
FIG. 3 is a pictorial view of the valve spring compressor tool, shown in a utilized state, according to the preferred embodiment of the present invention.

Referring now to FIG. 3, a pictorial view of the tool 10, shown in a utilized state, according to the preferred embodiment of the present invention is shown. An internal combustion engine 80 with an opened valve compartment 85 is depicted. A user 90 grips the motor housing 20 portion of the tool 10 in a manner similar to that used with other portable power tools, with the rechargeable battery 25 located below the motor housing 20. This configuration places the arms 30, each with its attached tool tip 45, in a position to engage a valve spring 95. It is noted that the tool 10 works equally effective on both intake and exhaust valve springs 95, and no attempt is made to limit usage of the tool 10 with either one (1), nor shall the herein described disclosure be limited to either the intake or exhaust valve spring 95. After engaging the valve spring 95 with the tool 10, the switch 50 and the variable speed trigger 55 (both of which are shown in FIG. 1) are utilized to collapse the valve spring 95 along the arm travel path "a" 40 (as shown in FIG. 1) and allow for the removal of said valve spring 95. This process is repeated for other remaining valve spring 95. The installation process relies on reversing the above-described process to allow for insertion of the valve spring 95. This process is similar to that used with manually operated valve spring removal tools with the exception of reduced physical activity and required strength of the user 90 due to the powered nature of the tool 10.

Figure 4:
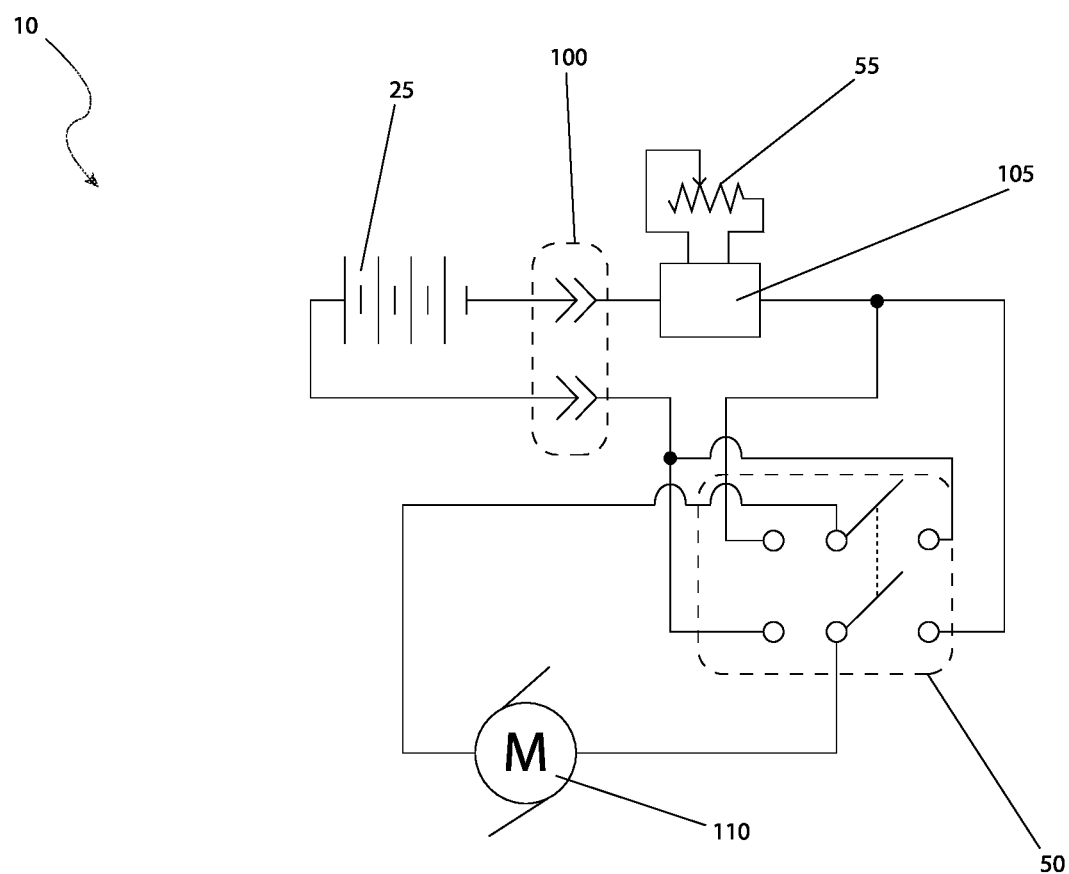
FIG. 4 is an electrical block diagram of the valve spring compressor tool, according to the preferred embodiment of the present invention.

Referring to FIG. 4, an electrical block diagram of the tool 10, according to the preferred embodiment of the present invention is disclosed. Power is derived from the rechargeable battery 25 and passes through a set of battery contacts 100 which allow for removal of the rechargeable battery 25 from the tool 10 along the battery removal/replacement path "b" 60 (both of which are shown in FIG. 1). Resultant power passes through a variable speed control circuit 105 which is controlled by the variable speed trigger 55. The variable speed control circuit 105 produces a modulated power signal to allow for variable speed as well as low speed operation. Electrical power then passes to a switch 50 which reverses the polarity of the voltage and thus the direction of rotation of a drive motor 110.

2. Operation of the Preferred Embodiment

The preferred embodiment of the present invention can be utilized by the common user 90 in a simple and effortless manner with little or no training. It is envisioned that the tool 10 would be constructed in general accordance with FIG. 1 through FIG. 4. The user 90 would procure the tool 10 from conventional procurement channels such as hardware stores, home improvement stores, mechanical supply houses, mail order and internet supply houses and the like.

After procurement and prior to utilization, the tool 10 would be prepared in the following manner: the rechargeable battery 25 would be properly charged and inserted into the motor housing 20 along the battery removal/replacement path "b" 60; and the proper tool tips 45 would be inserted into both arms 30 by manipulation of the retaining means 65. At this point in time the tool 10 is ready for use.

During utilization of the tool 10, the tool tips 45 would be manipulated onto the valve spring 95 as depicted in FIG. 4. Once fully engaged, the user 90 would activate the switch 50 and the variable speed trigger 55 to cause the arms 30 move along the arm travel path "a" 40 in an inward manner thus compressing the valve spring 95. The valve spring 95 is then removed. To remove the valve spring 95 from the tool 10, the switch 50 is toggled and the variable speed trigger 55 is once again activated to open the arms 30 and release the valve spring 95.

After use of the tool 10, it is stored until needed again with the rechargeable battery 25 available for charging or use in other portable power tools.

The features of the tool 10 provide the following benefits: portable operation anywhere due the rechargeable feature of the rechargeable battery 25, the adjustable ability of the interchangeable removable tool tips 45, easy to use; lightweight operation, modular design, increased power when compared to conventional manual valve spring removal tools, and the ability to be utilized by users with arthritis, limited strength, disability, or advanced age.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A valve spring compressor tool comprising:
    a motor housing including a motor, an open/close switch, and a variable speed trigger, said variable speed trigger configured to modulate the speed of the motor during operation;
    a rechargeable battery removably attached to the motor housing along a battery removal/replacement path, wherein said rechargeable battery is interchangeable with batteries used in a family of power tools;
    a compression head coupled to the motor housing, said compression head including a pair of pivoting arms configured to open and close along an arm travel path;
    a removable tool tip disposed at the distal end of each of the pair of arms, said removable tool tips having differing internal diameters and flanged openings for engaging valve springs of various sizes; and,
    a retaining means for securing the removable tool tips to the arms, wherein the retaining means permits removal of the removable tool tips along a tool tip removal path; and,
    wherein the tool is configured to collapse and decompress valve springs on internal combustion engines with reduced user exertion by utilizing the motor and variable speed trigger.

2. The valve spring compressor tool of claim 1, wherein:
    the retaining means comprises a spring pin, allowing the removable tool tips to be securely fastened and easily detached;
    the motor housing further includes a switch configured to reverse the polarity of the voltage supplied to the motor, enabling the tool to perform opening and closing motions for both installation and removal of valve springs; and,
    the tool tips are interchangeable such that one or more tool tips with differing internal diameters are installable on either arm, thereby accommodating valve springs from a plurality of internal combustion engine manufacturers.

\* \* \* \* \*